March 30, 1926.  1,579,064
C. G. G. BERGSTROM
ATTACHMENT FOR MOTOR VEHICLE TRANSMISSIONS
Filed June 8, 1925    2 Sheets-Sheet 1

Inventor:
Carl G. G. Bergstrom
By Whiteley and Ruckman
Attorneys.

March 30, 1926.
C. G. G. BERGSTROM
1,579,064
ATTACHMENT FOR MOTOR VEHICLE TRANSMISSIONS
Filed June 8, 1925   2 Sheets-Sheet 2
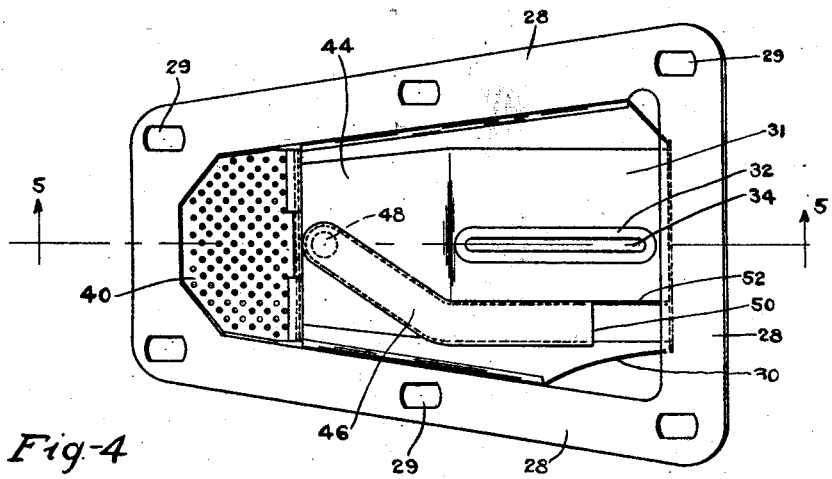
Fig.-4
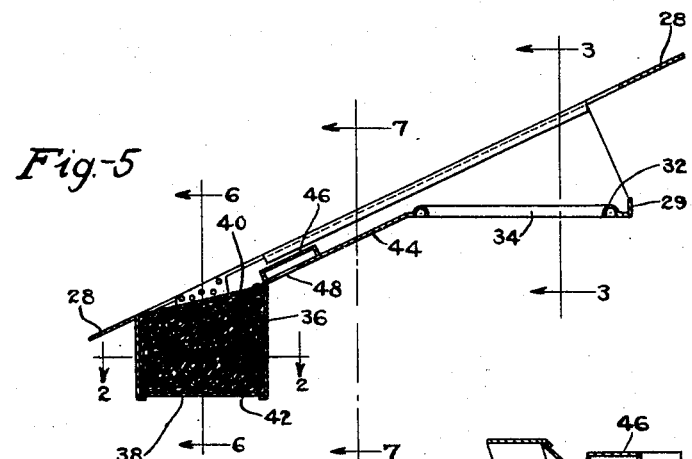
Fig.-5
Fig.-6
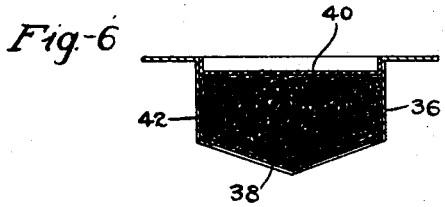
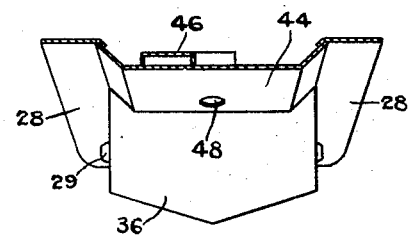
Fig.-7
Inventor:
Carl G. G. Bergstrom.
By Whiteley and Rickman
Attorneys.

Patented Mar. 30, 1926.

1,579,064

UNITED STATES PATENT OFFICE.

CARL G. G. BERGSTROM, OF ST. PAUL, MINNESOTA.

ATTACHMENT FOR MOTOR-VEHICLE TRANSMISSIONS.

Application filed June 8, 1925. Serial No. 35,645.

*To all whom it may concern:*

Be it known that I, CARL G. G. BERGSTROM, a citizen of the United States, residing at St. Paul, in the county of Ramsey and State of Minnesota, have invented certain new and useful Improvements in Attachments for Motor-Vehicle Transmissions, of which the following is a specification.

My invention relates to attachments for motor vehicle transmissions. An object is to provide a device which will filter the oil in the transmission case. Another object is to provide a device which will insure an adequate supply of oil free from solid particles and dirt to the bands and clutch fork and clutch ring employed in the transmission casing. This invention is an improvement on that disclosed in my Patent No. 1,536,756 dated May 5, 1925.

The full objects and advantages of my invention will appear in connection with the detailed description thereof and the novel features embodied in my inventive idea will be particularly pointed out in the claims.

Figure 1:
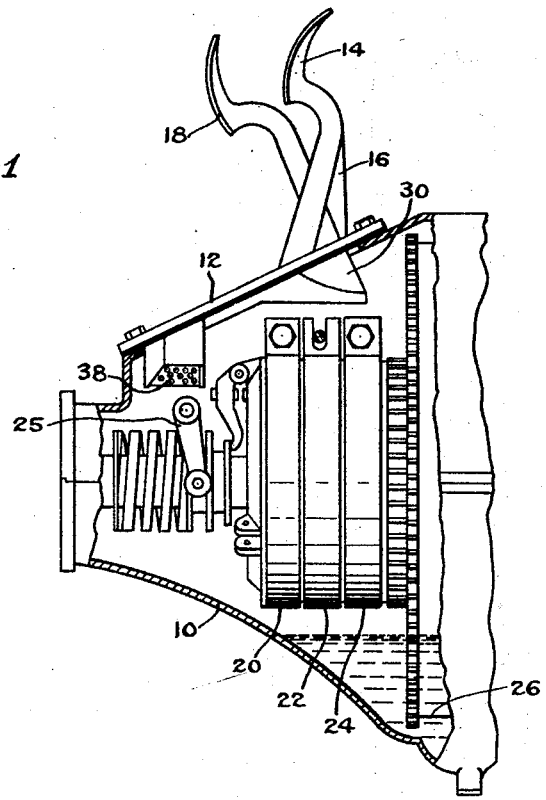
Figure 2:
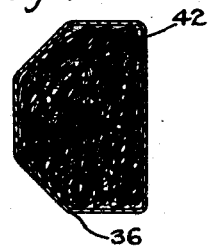
Figure 3:
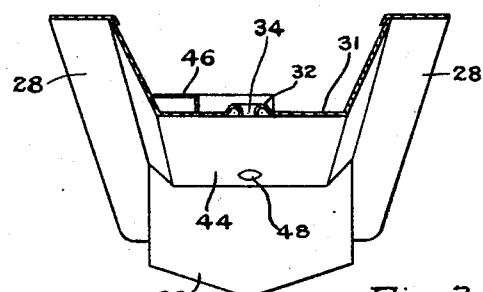

In the accompanying drawings which illustrate a practical embodiment of my invention, Fig. 1 is a longitudinal, elevational, sectional view of a portion of a motor vehicle transmission showing the device in place therein. Fig. 2 is a view in horizontal section on the line 2—2 of Fig. 5. Fig. 3 is a view in vertical section on the line 3—3 of Fig. 5. Fig. 4 is a top plan view of the device. Fig. 5 is a view in longitudinal section on the line 5—5 of Fig. 4. Fig. 6 is a view in vertical section on the line 6—6 of Fig. 5. Fig. 7 is a view in vertical section on the line 7—7 of Fig. 5.

Referring to the construction shown in the drawings the numeral 10 designates the transmission casing of a motor vehicle. This casing is provided with an opening for a cover 12. Outside of the casing are the customary brake pedal 14, clutch pedal 16 and reverse pedal 18 which operate in connection with the brake band 20, slow speed band 22, reverse band 24, and clutch fork 25 located inside the casing 10. Also within the casing and secured to the crank shaft is the customary fly wheel 26, the lower portion of which runs below the surface of the oil ordinarily placed in the casing. My device includes a dished sheet metal member having a peripheral flange 28 provided with holes 29 for receiving the bolts which secure the cover 12 in place. The portion of the device between the surrounding flange 28 is dished as shown in Figs. 3, 5 and 7, and the device when in place beneath the cover 12 assumes the position shown in Figs. 1 and 5 so as to be inclined with its upper end adjacent the upper portion of the fly wheel 26. One of the side walls of the dished device at its upper end portion is cut away to provide an opening 30 thru which the oil is thrown by the fly wheel when rotating. As best shown in Fig. 5 the rear upper wall of the dished portion is almost entirely cut away so as to leave only an upwardly extending flange 29. The bottom of the device at its upper end is horizontal whereby the floor 31 is provided, and this floor has an oval rib 32 which surrounds an opening 34 located directly over the bands 20, 22 and 24. The lower portion of the device is provided with an inclosing wall 36 which forms a filter chamber having a perforated bottom 38 and a perforated hinged cover 40. Suitable filtering material 42 is placed in the filtering chamber. As shown in Fig. 6 the bottom 38 is inclined downwardly from both sides toward the middle. The rear upper edge of the wall 36 is connected with the horizontal floor 31 by an inclined floor portion 44. Secured upon the upper surface of the floor portions 31 and 44 is a tunnel member 46, which as will be understood from Fig. 4, extends down at one side of the floor portion 31 and continues on down the floor portion 44 at an angle so that its lower end is centrally disposed. The floor portion 44, underneath the lower end of the tunnel member, is provided with a perforation 48 located above the clutch fork and ring. The top wall of the upper end of the tunnel member is cut away as shown at 50 in Fig. 4 with the side wall 52 left so as to provide a pocket into which some of the oil is received.

The operation and advantages of my invention will be obvious in connection with the foregoing description. Oil thrown off by the fly wheel 26 passes thru the opening at the upper end of the device and falls upon the floor 31, and runs down to the filter which retains the solid particles of grit and dirt carried by the oil. The filtered oil drops from the lower end of the filtering chamber back into the casing and some of it will pass over the clutch fork. Oil accumulates in the top of the filtering chamber faster than it can run thru and therefore backs up on the inclined bottom 44 and flows over the rib 32 so as to drop on the bands 20, 22 and 24. The filter removes steel cuttings, carbon, sand, grit, road dust, lint, fuzz from the brake bands and other extraneous material from the crank case oil thereby preventing burnt out bearings, scored cylinders and excessive wear of the parts to which the oil is supplied. The duct formed by the tunnel member 46 insures the delivery of a constant stream of oil to the clutch ring and fork even should the filter become clogged with the material extracted from the oil.

I claim:

1. An attachment for motor vehicle transmissions comprising a dished member for catching oil thrown off from the fly wheel, said member having an inclined floor portion, a filter at the lower end of said inclined floor portion, the upper portion of the floor of said member having an opening above the bands of the transmission, and a tunnel member leading from the upper end of the device, said tunnel member at its lower end being adapted to deliver oil to the clutch fork and ring.

2. An attachment for motor vehicle transmission comprising a dished member for catching oil thrown off from the fly wheel, said member having a horizontal floor and an inclined floor leading from said horizontal floor, a filter at the lower end of said inclined floor, said horizontal floor having an opening above the bands of the transmission and a tunnel member extending along said horizontal and inclined floors, said tunnel member being open at its upper end to receive oil and at its lower end being adapted to deliver oil to the clutch fork and ring.

In testimony whereof I hereunto affix my signature.

CARL G. G. BERGSTROM.